(12) United States Patent
Kim et al.

(10) Patent No.: US 7,743,632 B2
(45) Date of Patent: *Jun. 29, 2010

(54) WASHING MACHINE

(75) Inventors: Jin Woong Kim, Kyungki-do (KR); Kyung Chul Woo, Seoul (KR); Soo Young Oh, Seoul (KR); Si Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/723,732

(22) Filed: Mar. 21, 2007

(65) Prior Publication Data

US 2007/0169521 A1 Jul. 26, 2007

Related U.S. Application Data

(62) Division of application No. 10/822,758, filed on Apr. 13, 2004.

(30) Foreign Application Priority Data

Apr. 14, 2003 (KR) ........................ 10-2003-0023319

(51) Int. Cl.
*D06F 33/00* (2006.01)

(52) U.S. Cl. ......................... 68/12.22; 68/12.01; 68/15; 68/207

(58) Field of Classification Search ............... 68/12.01, 68/12.22, 15, 207
See application file for complete search history.

(56) References Cited

U.S. PATENT DOCUMENTS

| | | | |
|---|---|---|---|
| 1,852,179 A | 4/1932 | McDonald | |
| 1,946,278 A | 2/1934 | Elfving | |
| 2,880,300 A | 3/1959 | Reimers et al. | |
| 3,347,066 A | 10/1967 | Klausner | |
| 3,402,576 A | 9/1968 | Krupsky | |
| 3,712,089 A | 1/1973 | Toth | |
| 4,527,343 A | 7/1985 | Danneberg | |
| 4,941,333 A | 7/1990 | Blessing | |
| 5,390,385 A | 2/1995 | Beldham | |
| 6,023,950 A | 2/2000 | Battistella | |
| 6,167,733 B1 * | 1/2001 | Lee | ............................ 68/18 F |
| 6,311,527 B1 | 11/2001 | Monteiro et al. | |
| 6,516,484 B2 * | 2/2003 | Kwon | ............................ 8/158 |
| 6,585,781 B1 | 7/2003 | Roseen | |
| 7,021,087 B2 | 4/2006 | France et al. | |

(Continued)

FOREIGN PATENT DOCUMENTS

CH 684198 A5 7/1994

(Continued)

*Primary Examiner*—Michael Barr
*Assistant Examiner*—Jason Heckert
(74) *Attorney, Agent, or Firm*—Birch, Stewart, Kolasch & Birch, LLP

(57) ABSTRACT

A washing method in a steam injection type washing machine in which wash water is heated to generate high temperature and high-pressure steam while passing through the steam supply unit in the wash or rinse cycle, and the generated steam is injected into the wash tub at the top of the wash tub. Accordingly, it is possible to rapidly achieve the wetting of clothes with wash water while achieving an enhancement in sterilization and washing performances. In addition, consumption of water and electrical energy can be reduced.

13 Claims, 8 Drawing Sheets

U.S. PATENT DOCUMENTS

| | | | |
|---|---|---|---|
| 2002/0178764 A1 | 12/2002 | Bolduan et al. | |
| 2003/0061842 A1 | 4/2003 | Ryu et al. | |

FOREIGN PATENT DOCUMENTS

| | | | |
|---|---|---|---|
| CN | 1373248 A | | 10/2002 |
| DE | 44 31 654 A1 | | 3/1996 |
| DE | 197 43 508 A1 | * | 8/1999 |
| EP | 0390264 A1 | | 3/1990 |
| EP | 0772000 A1 | | 5/1997 |
| EP | 0 816 550 A1 | | 1/1998 |
| EP | 0816550 | * | 1/1998 |
| EP | 0843039 A1 | | 5/1998 |
| EP | 1 275 767 A1 | | 1/2003 |
| EP | 1464751 A1 | | 10/2004 |
| EP | 1746196 A2 | | 1/2007 |
| GB | 21286 | | 8/1898 |
| GB | 799788 | | 8/1958 |
| GB | 835250 | | 5/1960 |
| GB | 1 222 227 | | 2/1971 |
| GB | 2 113 722 A | | 8/1983 |
| GB | 2 348 213 A | | 9/2000 |
| JP | 55-148933 U | | 4/1982 |
| JP | 59-37988 A | | 3/1984 |
| JP | 61128995 | * | 6/1986 |
| JP | 62-66891 A | | 3/1987 |
| JP | 4-158896 | | 6/1992 |
| JP | 05-269294 A | | 10/1993 |
| JP | 11-226290 A | | 8/1999 |
| JP | 2002-360987 | | 12/2002 |
| JP | 2003-019382 | * | 1/2003 |
| JP | 2003-19382 A | | 1/2003 |
| JP | 2003-019382 A | | 1/2003 |
| JP | 2003-93775 A | | 4/2003 |
| JP | 2003-311084 A | | 11/2003 |
| KR | 20-0128631 Y1 | | 8/1998 |
| KR | P1998-066799 A | | 10/1998 |
| WO | WO-97/15709 A1 | | 5/1997 |
| WO | WO-03/012185 A2 | | 2/2003 |

* cited by examiner

WASHING MACHINE

CROSS-REFERENCE TO RELATED APPLICATIONS

This application is a Divisional of co-pending application Ser. No. 10/822,758, filed on Apr. 13, 2004, and for which priority is claimed under 35 U.S.C. §120; and this application claims priority under 35 U.S.C. §119 of Korean application 10-2003-0023319 filed Apr. 14, 2003, the entire contents of each of which are hereby incorporated by reference.

BACKGROUND OF THE INVENTION

1. Field of the Invention

The present invention relates to a washing machine, and more particularly to a washing method in a steam injection type washing machine in which steam is injected into a wash tub at the top of the wash tub.

2. Description of the Related Art

Referring to FIG. 1, a conventional washing machine is illustrated. As shown in FIG. 1, the conventional washing machine includes a cabinet 2 defining the appearance of the washing machine, and carrying a door 1. The conventional washing machine also includes a wash tub including a tub 4 fixedly installed in the cabinet 2, and a drum 6 rotatably installed in the tub 4, and provided with a plurality of water holes 5. The conventional washing machine further includes a drive unit 8 connected with the drum 6 via a rotating shaft 7, and adapted to rotate the drum 6, a water supply unit 10 for supplying wash water into the wash tub, and a drainage unit 12 for draining wash water from the wash tub.

A detergent supply unit 14 containing detergent therein is arranged at a top portion of the cabinet 2. The water supply unit 10 is connected with the detergent supply unit 14 so that detergent can be supplied from the detergent supply unit 14 into the wash tub, along with wash water.

The tub 4 is connected, at the top thereof, to the top of the cabinet 2 via a spring 16 while being connected, at the bottom thereof, to the bottom of the cabinet 2 via a damper 17 having a damping function.

The above mentioned washing machine may further include a heater 20 adapted to heat wash water supplied into the wash tub. The tub 4 is recessed at a bottom portion thereof to provide a heater chamber 21 for receiving the heater 20 therein.

Now, operation of the conventional washing machine having the above mentioned configuration will be described.

When a wash cycle is begun, wash water is supplied into the tub 4 and drum 6 in accordance with the amount of clothes contained in the drum 6, along with detergent. In this state, the drum 6 is rotated in accordance with a drive force from the driving unit 8. As a result, a washing operation is carried out by virtue of a combination of an emulsification function of the detergent with frictional forces generated between the drum 6 and water flows in the drum 6.

When the heater 20 operates during the washing operation in accordance with an operating mode set by the user, the wash water supplied into the tub 4 and drum 6 is heated. That is, an increase in wash temperature is achieved, so that it is possible to easily remove stains from clothes.

After completion of the wash cycle, the wash water is drained. Fresh wash water is then again supplied into the tub 4 and drum 6. Simultaneously, the drum 6 is rotated to execute a rinse cycle. Finally, the drum 6 is rotated at high speed to execute a spin-dry cycle. Thus, the clothes are completely washed.

In the above mentioned conventional washing machine, wash water is supplied into the tub 4 and drum 6 through top portions thereof, and then permeates into clothes contained in the drum 6 to wet the clothes. On the other hand, the heater 20 is arranged at the bottom of the tub 4. For this reason, in a washing mode using wash water heated by the heater 20, the clothes contained in the drum 6 are wetted by cold wash water at an initial water supply stage without being wetted by hot wash water. As a result, the wetting speed of the clothes is low, so that the efficiency of the heater 20 is degraded.

In the conventional washing machine, the heater chamber 21 should be provided at the tub 4 in the form of a separate space to install the heater 20. In particular, the heater chamber 21 is provided by downwardly recessing a bottom portion of the tub 4. Due to such a structure, wash water supplied into the tub 4 unnecessarily fills the heater chamber 21, so that there is waste of wash water. Furthermore, detergent is also left in the heater chamber 21, so that there is waste of detergent.

SUMMARY OF THE INVENTION

The present invention has been made in view of the above mentioned problems involved with the related art, and it is an object of the invention to provide a washing method in a steam injection type washing machine in which steam is injected into a wash tub at the top of the wash tub, thereby being capable of achieving an enhancement in washing performance.

In accordance with one aspect, the present invention provides a washing method in a steam injection type washing machine, comprising: a washing step for performing a washing process while rotating a wash tub when wash water is supplied into the wash tub; and a steam supplying step for injecting-steam into the wash tub during execution of the washing step, thereby increasing a temperature of the wash water supplied into the wash tub.

The washing step may comprise a clothes wetting step for supplying wash water into the wash tub to a water level lower than a predetermined water level for washing of clothes, thereby causing clothes contained in the wash tub to be wetted by the supplied wash water, and a main washing step for supplying wash water into the wash tub to the predetermined water level for washing of clothes after execution of the clothes wetting step, and performing a main washing process. The wash water supplied into the wash tub may be pumped to a top portion of the wash tub, at the clothes wetting step, to circulate through the wash tub.

The steam supplying step may comprise a water supplying step for supplying wash water into a tank provided with a heater, a steam generating step for heating the wash water supplied into the tank by operation of the heater, thereby generating steam, and a steam injecting step for injecting the steam generated at the steam generating step into the wash tub.

The water supplied into the tank at the water supplying step may be limited to a predetermined water level by a water level sensor provided at the tank.

The water supplying step may be executed while wash water is supplied into the wash tub. The water supplying step may comprise the steps of simultaneously opening a water supply line adapted to guide wash water into the tank and a steam supply line adapted to guide steam from the tank into the wash tub when wash water is supplied into the wash tub, and closing the water supply line and the steam supply line when wash water is supplied into the wash tub to a minimum reset water level sensible by a water level sensor provided at the wash tub.

The water supplying step may further comprise the step may further comprise the step of, if an internal temperature of the tank reaches a predetermined temperature, re-supplying wash water into the tank until the water level sensor senses a variation in water level.

The operation of the heater may be stopped when an internal pressure of the tank reaches a predetermined pressure at the steam generating step. The steam injecting step may be executed when the operation of the heater is stopped at the steam generating step.

The operation of the heater may be stopped when a temperature of heat generated from the heater reaches a predetermined temperature at the steam generating step.

The heater may be operated for a predetermined operating time at the steam generating step.

The steam injecting step may be executed when an internal temperature of the tank reaches to a predetermined temperature. The steam injecting step may be completed when a wash water temperature of the wash tub reaches a predetermined wash water temperature.

In accordance with another aspect, the present invention provides a washing method in a steam injection type washing machine, comprising: a washing step for wetting clothes contained in a wash tub by wash water supplied into the wash tub while circulating the wash water through the wash tub; and performing a washing process while rotating the wash tub; a water supplying step for supplying wash water into a tank provided with a heater during execution of the washing step; a steam generating step for heating the wash water supplied into the tank by operation of the heater, thereby generating steam; and a steam injecting step for injecting the steam generated at the steam generating step into the wash tub.

The water supplying step may be executed while wash water is re-supplied into the wash tub at the washing step.

The water supplying step may comprise the steps of simultaneously opening a water supply line adapted to guide wash water into the tank and a steam supply line adapted to guide steam from the tank into the wash tub when wash water is supplied into the wash tub, and closing the water supply line and the steam supply line when wash water is supplied into the wash tub to a minimum reset water level sensible by a water level sensor provided at the wash tub.

In accordance with still another aspect, the present invention provides a washing method in a steam injection type washing machine, comprising: a washing step for performing a washing process while rotating a wash tub when wash water is supplied into the wash tub; a water supplying step for filling wash water in a tank provided with a heater while the wash water is supplied into the wash tub to a minimum reset water level sensible by a water level sensor provided at the wash tub; a steam generating step for operating the heater until an internal pressure or temperature of the tank reaches to a predetermined internal pressure or temperature, or until an operating time of the heater reaches a predetermined operating time, after execution of the water supplying step, to heat the wash water in the tank, thereby generating steam in the tank; a steam injecting step for, if the internal temperature of the tank reaches the predetermined internal temperature, injecting the generated steam into the wash tub until a wash water temperature of the wash tub reaches a predetermined wash water temperature.

The washing step may comprise a clothes wetting step for supplying wash water into the wash tub to a water level lower than a predetermined water level for washing of clothes, thereby causing clothes contained in the wash tub to be wetted by the supplied wash water, and a main washing step for supplying wash water into the wash tub to the predetermined water level for washing of clothes after execution of the clothes wetting step, and performing a main washing process. The wash water supplied into the wash tub may be pumped to a top portion of the wash tub, at the clothes wetting step, to circulate through the wash tub.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, embodiments of a washing method in a steam injection type washing machine according to the present invention will be described in detail with reference to the annexed drawings.

Although there may be various embodiments associated with the washing method according to the present invention applicable to a steam injection type washing machine, the following description will be given in conjunction with the most preferred embodiment. In the following description, the basic configuration of a steam injection type washing machine, to which the washing method according to the present invention is applied, will not be given because it is identical to that of conventional steam injection type washing machines.

Figure 1:
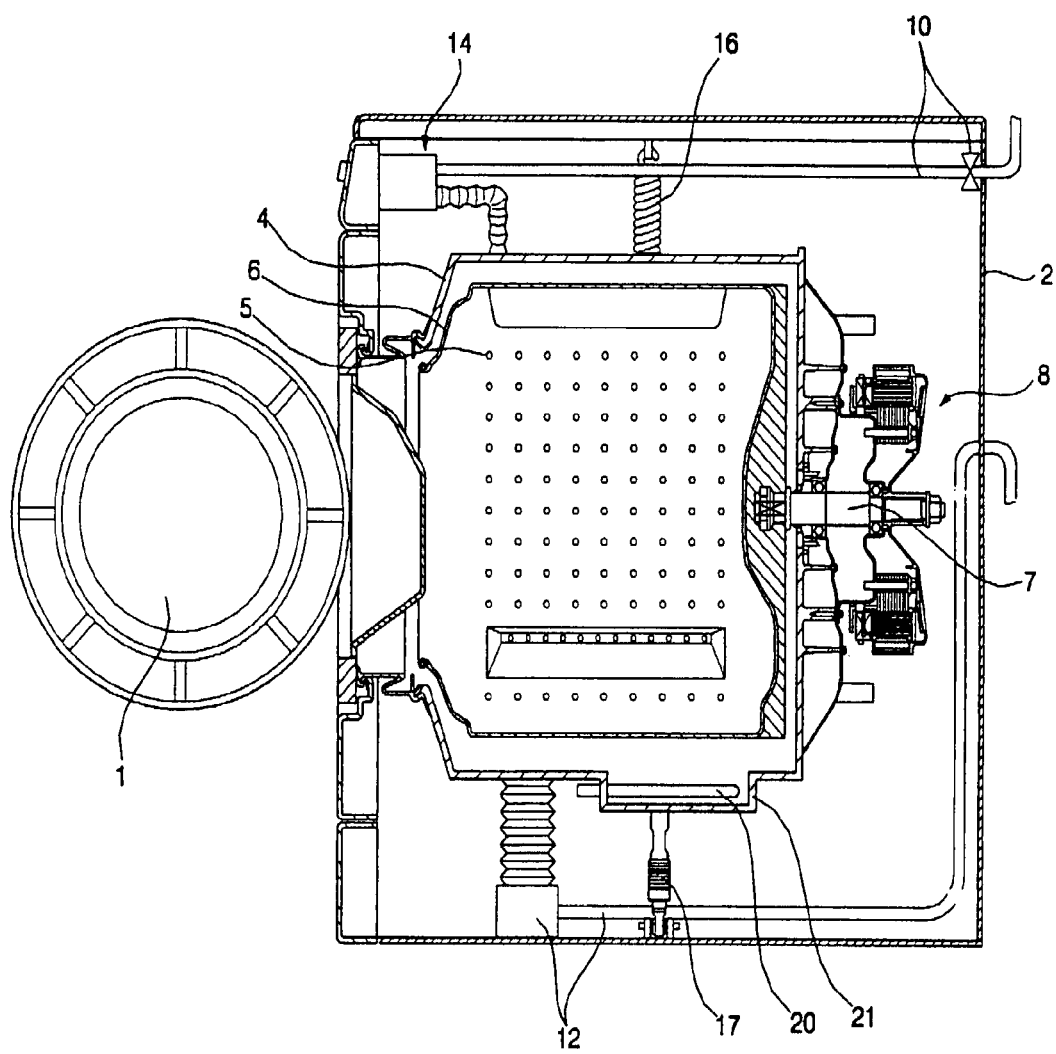
FIG. 1 is a sectional view illustrating a conventional washing machine.
Figure 2:
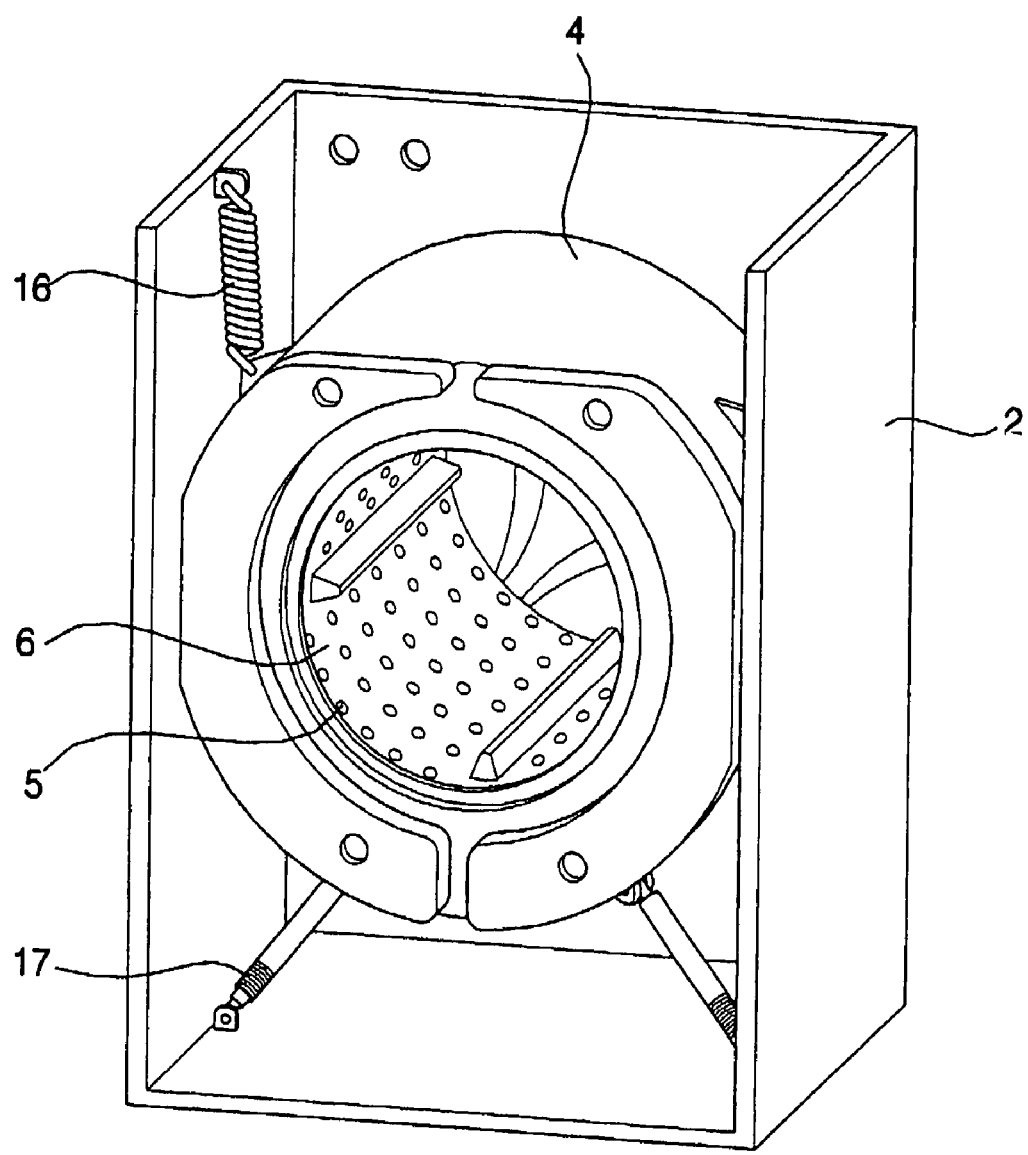
FIG. 2 is a perspective view illustrating an essential part of the conventional washing machine.
Figure 3:
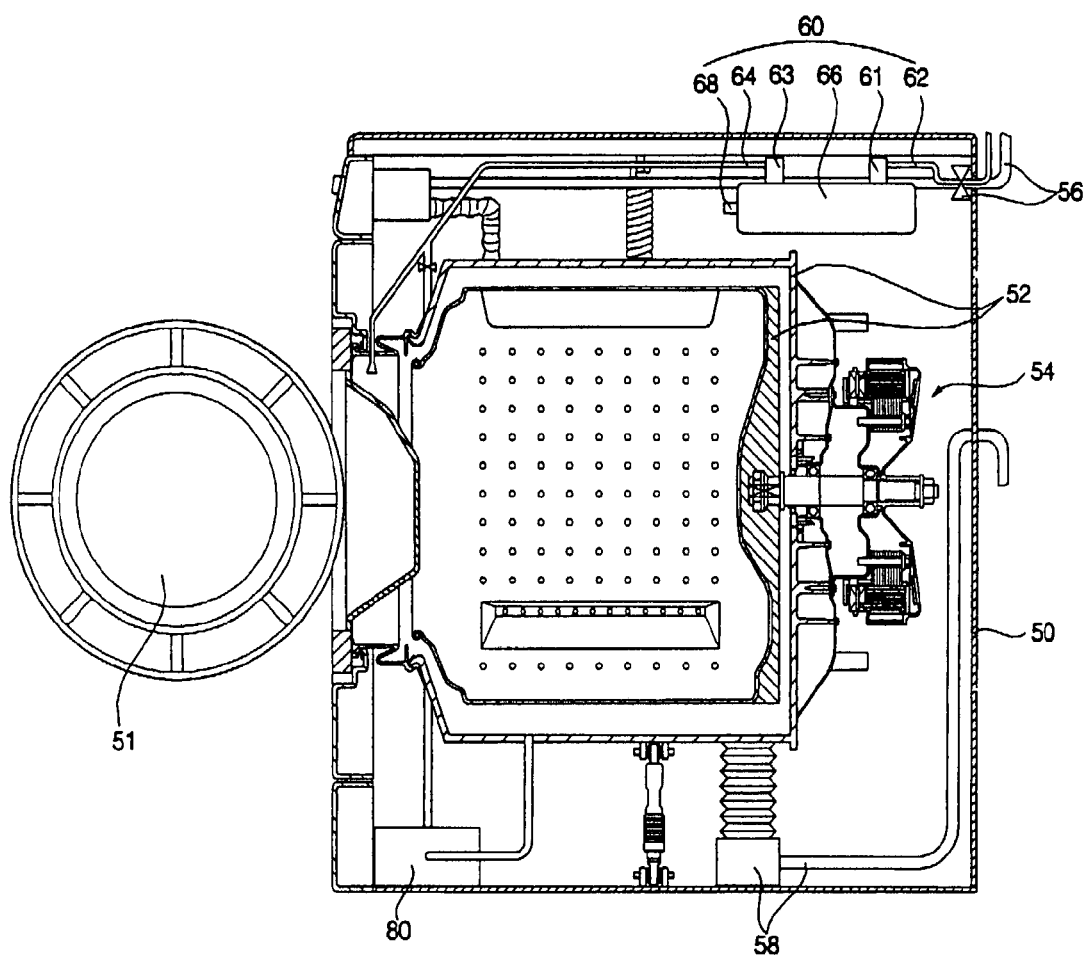
FIG. 3 is a sectional view illustrating a steam injection type washing machine, to which a washing method according to the present invention is applied.
Figure 4:
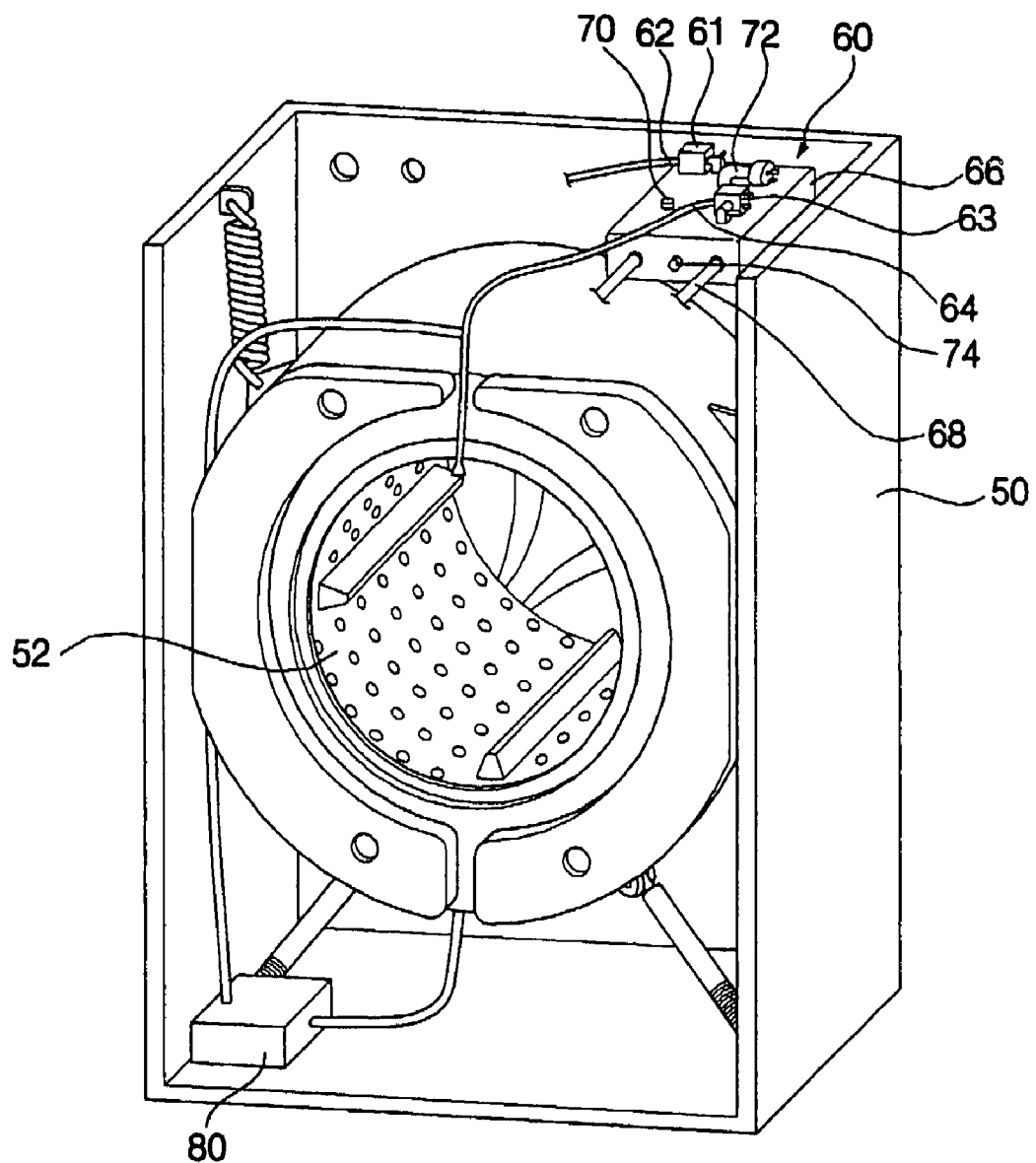
FIG. 4 is a perspective view illustrating an essential part of the steam injection type washing machine, to which the washing method according to the present invention is applied.
Figure 5:
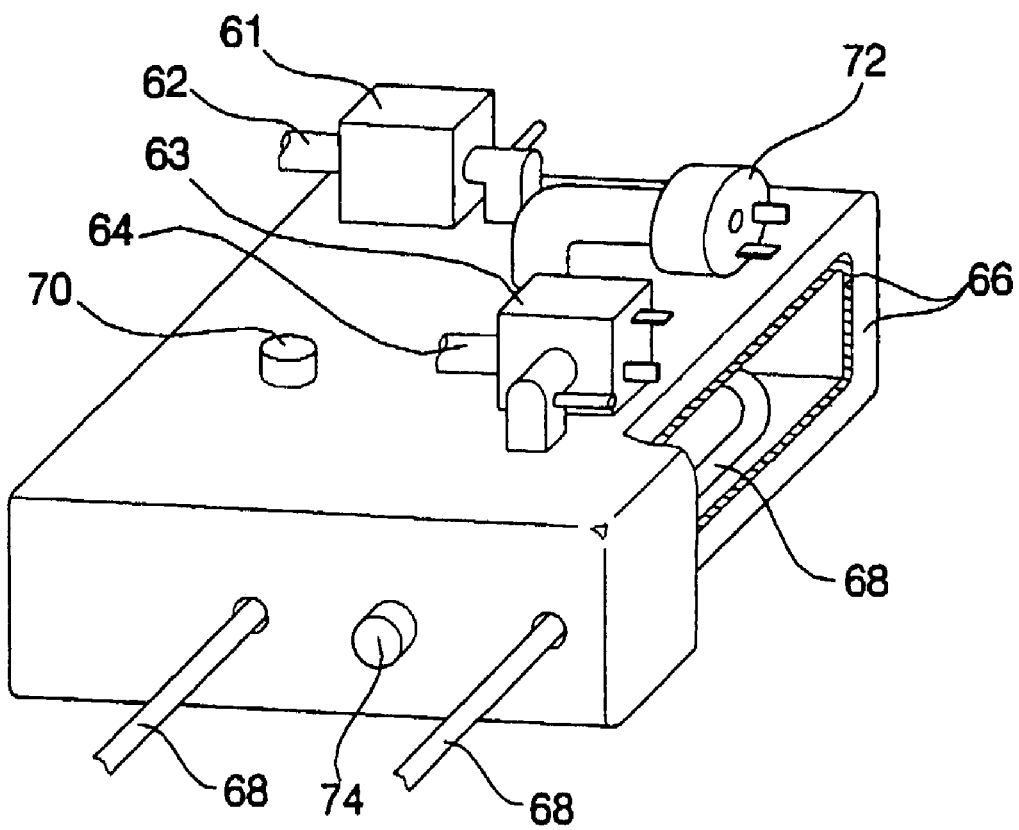
FIG. 5 is a perspective view illustrating a steam supplying device equipped in the steam injection type washing machine, to which the washing method according to the present invention is applied.

FIG. 3 is a sectional view illustrating a steam injection type washing machine, to which a washing method according to the present invention is applied. FIG. 4 is a perspective view illustrating an essential part of the steam injection type washing machine, to which the washing method according to the present invention is applied. FIG. 5 is a perspective view illustrating a steam supplying device equipped in the steam 1 injection type washing machine, to which the washing method according to the present invention is applied.

The steam injection type washing machine, to which the washing machine according to the present invention is applied, includes a cabinet 50, to which a door 51 is hingeably mounted. The washing machine also includes a wash tub 52 installed in the cabinet 50, a drive unit 54 adapted to rotate the wash tub 52, a water supply unit 56 adapted to supply wash water into the wash tub 52, a drainage unit 58 adapted to drain wash water from the wash tub 52, and a steam supply unit 60 adapted to supply steam into the wash tub 52 at the top of the wash tub 52.

The steam supply unit 60 includes a tank 66 connected to the water supply unit 60 via a water supply line 62 while being connected to the wash tub 52 via a steam supply line 64, a heater 68 arranged in the tank 66, and adapted to heat wash water supplied into the tank 66, thereby generating steam to be supplied into the wash tub 52, a water supply valve 61 installed at the water supply line 62, and a steam supply valve 63 installed at the steam supply line 64.

A temperature sensor 70 is installed on the top of the tank 66 to sense an internal temperature of the tank 66. The heater 68 is provided with an automatic pressure switch 72 and an automatic temperature switch 74 respectively adapted to switch off operation of the heater 68 in accordance with the internal pressure and temperature of the tank 66.

Meanwhile, a circulation pump 80 may be installed in the cabinet 50 between the bottom of the wash tub 52 and the steam 1 supply line 64 to pump wash water contained in the wash tub 52 to the top of the wash tub 52.

Now, a washing method according to a first embodiment of the present invention, which is applied to the steam injection type washing machine having the above described configuration, will be described with reference to FIGS. 3 to 7.

Figure 6:
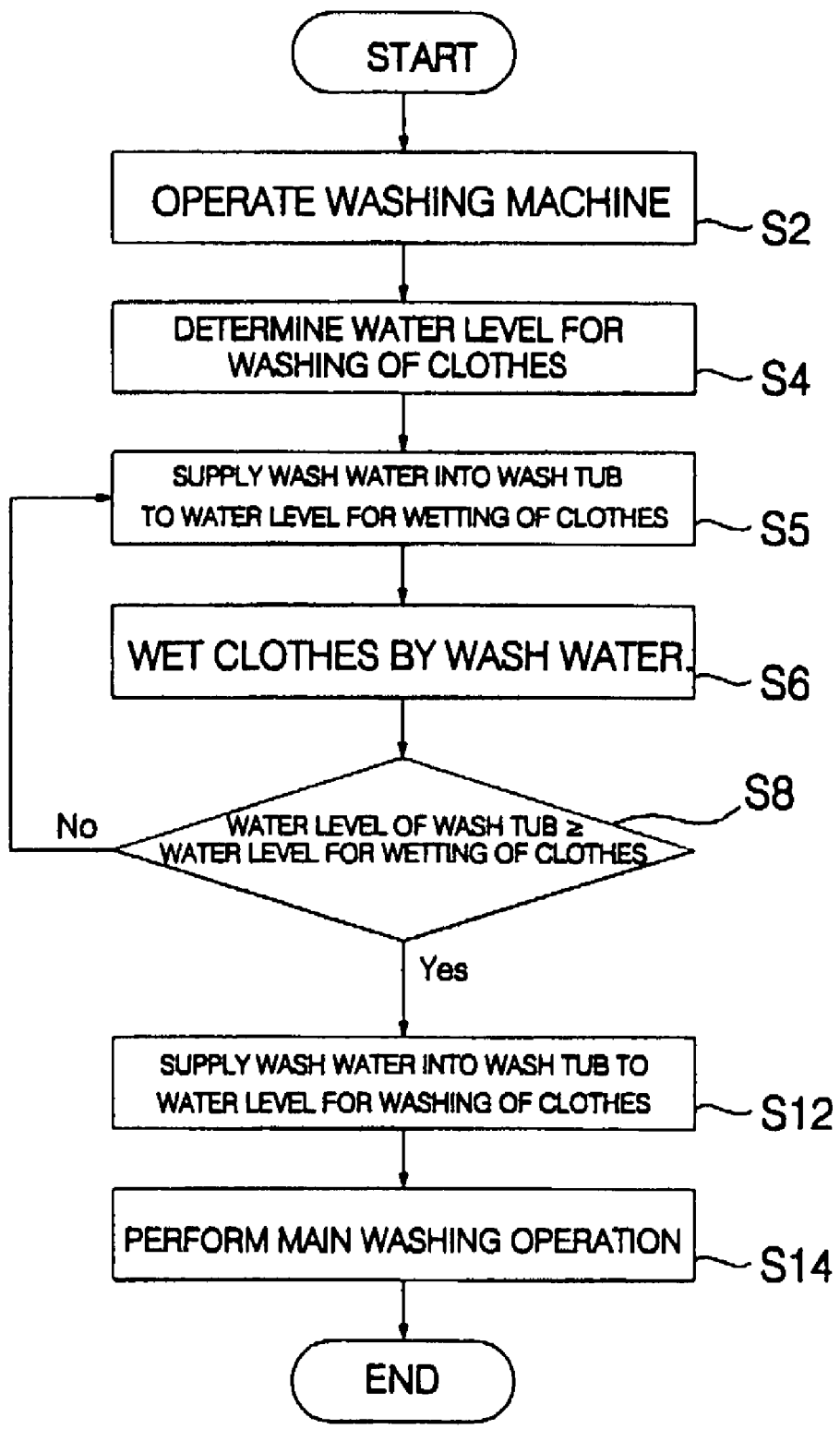
FIG. 6 is a flow chart illustrating a washing process involved in a washing method according to a first embodiment of the present invention carried out in the steam injection type washing machine.
Figure 7:
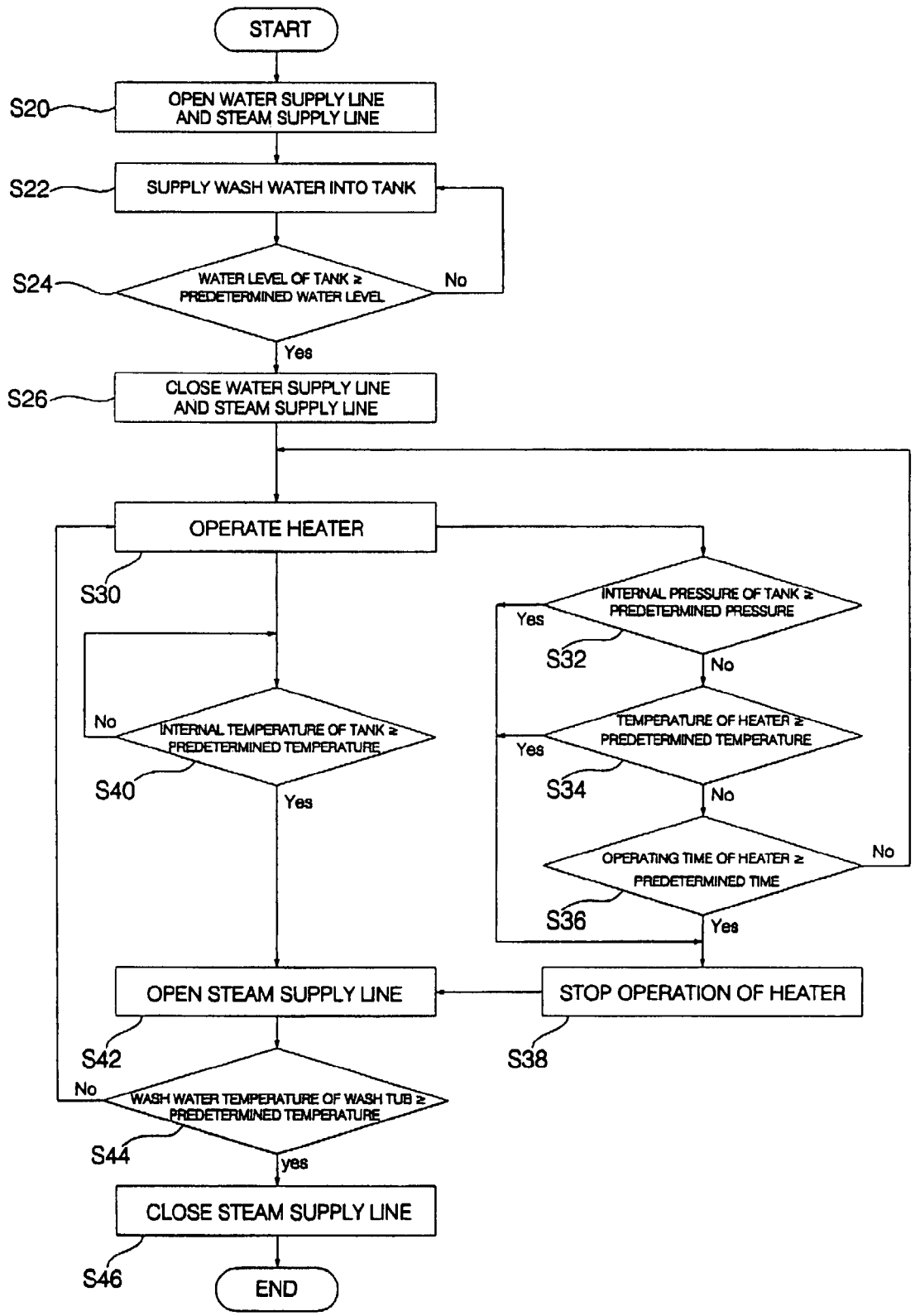
FIG. 7 is a flow chart illustrating a steam supplying process involved in the washing method according to the first embodiment of the present invention carried out in the steam injection type washing machine.

FIG. 6 is a flow chart illustrating a washing process in a washing method according to a first embodiment of the present invention carried out In the steam injection type washing machine. FIG. 7 is a flow chart illustrating a steam supplying process in a washing method according to the first embodiment of the present invention carried out in the steam injection type washing machine.

The washing method according to the first embodiment of the present invention includes a washing process for executing a washing operation while rotating the wash tub 52 in a state in which wash water is supplied into the wash tub 52 (FIG. 6), and a steam supplying process for injecting steam into the wash tub 52 during execution of washing steps S2 to S14 In the washing process, thereby increasing the temperature of wash water supplied into the wash tub 52 (FIG. 7).

As shown in FIG. 6, the washing process is begun when the washing machine operates under the condition in which clothes have been put into the wash tub 52 (Step S2). Thereafter, a required level of wash water in the wash tub 52 for washing of clothes contained in the wash tub 52 is determined, based on a sensed amount of the clothes (Step S4).

After the determination of the required water level of the wash tub 52, wash water is supplied into the wash tub 52 to a predetermined clothes wetting level lower than the required water level of the wash tub 52, in order to wet the clothes in the wash tub 52 by the supplied wash water (Step S5). In accordance with the supply of the wash water, a clothes wetting step is executed (Step S6). Where the circulation pump 80 is used, the wash water existing in the wash tub 52 is pumped toward the top of the wash tub 52 along the steam supply line 64 by the circulation pump 80, so that it is sprayed into the wash tub 52 at the top of the wash tub 52.

During the execution of the clothes wetting step S6, the water level of the wash tub 52 is sensed at intervals of a predetermined time. When it is determined that the sensed water level of the wash tub 52 is lower than the predetermined clothes wetting level (Step S8), the washing process is returned to step S5 to again supply wash water into the wash tub 52 to the predetermined clothes wetting level.

After completion of the clothes wetting step S6, wash water is supplied into the wash tub 52 to the required water level for washing of the clothes (Step S12). Thereafter, the wash tub 52 is rotated to perform a main washing operation (Step S14). During this main washing operation, the wash tub 52 may be replenished with wash water.

When the supply of the wash water into the wash tub 52 is carried out under the condition in which both the water supply line 62 and the steam supply line 64 are opened, the wash water may be supplied into the wash tub 52 via the water supply line 62, tank 66, and steam supply line 64, in this order.

In the steam supply process, as shown in FIG. 7, a water supplying procedure (Steps S20 to S26) is first carried out to supply wash water into the tank 66.

That is, both the steam supply line 62 and the steam supply line 64 are opened when replenishment of wash water is carried out in the washing process (Step S20), so that the wash water is introduced into the tank 66 via the water supply line 62. As the wash water fills the tank 66, air existing in the tank 66 is vented through the steam supply line 64. When the water level of the tank 66 reaches a predetermined level (Step S24), both the water supply line 62 and the steam supply line 64 are closed (Step S26).

A water level sensor may be installed in the tank 66 to sense the water level of the tank 66, thereby maintaining the tank 66 at an appropriate water level. Alternatively, mechanical means may be provided to discharge an excessive amount of water, supplied to a water level higher than a predetermined water level, into the wash tub 52 via the steam supply line 64.

Subsequently, a steam generating procedure (Steps S30 to S38) is carried out. In the steam generating procedure, the wash water supplied into the tank 66 is heated by the heater 68, thereby generating steam.

In the steam generating procedure, the heater 68 is first operated to generate steam (Step S30). When the internal pressure of the tank 66 reaches a predetermined pressure, that is, a critical pressure where a serious accident caused by high pressure may occur (Step 832), the operation of the heater 68 may be automatically stopped in accordance with operation of the automatic pressure switch 72 (Step S38).

Also, when the temperature of heat generated from the heater 68, that is, the temperature of the heater 68, reaches a predetermined temperature, that is, a critical temperature where a serious accident caused by high-temperatures may occur (Step S34), the operation of the heater 68 may be automatically stopped in accordance with operation of the automatic temperature switch 74 (Step S38).

For reference, In the illustrated embodiment of the present invention, it is first determined, based on the internal pressure of the tank 66, whether or not the operation of the heater 68 is to be stopped (Step S32). Then, it is determined, based on the temperature of the heater 68, whether or not the operation of the heater 68 is to be stopped (Step S34). Based on the operating time of the heater 68, it is then determined whether or not the operation of the heater 68 is to be stopped (Step S36). These determination steps may be executed in other orders or selectively executed.

When steam is generated in the tank 66 in accordance with the steam generating procedure (Steps. S30 to S38), a steam injecting procedure (Steps S40 to S46) is carried out to open the steam supply line 64, and thus, to inject the steam into the wash tub 52 via the steam supply line 64.

That is, when the internal temperature of the tank 66 reaches a predetermined steam injection temperature, at which injection of steam can be effectively achieved, (Step S40), the steam supply line 64 is opened. Of course, the steam injection temperature is lower than the predetermined temperature where a serious accident caused by high-temperatures may occur in the steam generating procedure (Steps S30 to S38).

Meanwhile, if the operation of the heater 66 is stopped due to the internal pressure of the tank 66 before the internal temperature of the tank 66 reaches the predetermined steam injection temperature in the steam generating procedure (Steps S30 to S36), the steam injecting procedure (Steps S40 to S46) is immediately carried out, irrespective of the internal temperature of the tank 66.

When the temperature of wash water in the wash tub 52 reaches, in the steam injecting procedure (Steps S40 to S46), a predetermined temperature, at which an enhanced washing performance can be achieved, (Step S44), the steam supply line 64 is closed so that the steam is no longer injected into the wash tub 52 (Step S46).

Under the condition in which the operation of the heater 68 is stopped before the steam injecting procedure (Steps S40 to S46) is completed, it is necessary to subsequently re-operate the heater 68 when the heater 68 has a condition for operation thereof. That is, in the case in which the operation of the heater 68 has been stopped due to an unacceptable internal pressure of the tank 66 or an unacceptable temperature of the heater 68, the heater 68 is again operated when the internal pressure of the tank 66 and the temperature of the heater 68 are lowered to acceptable levels, respectively. Also, where the operation of the heater 68 has been stopped due to the lapse of the predetermined operating time, the heater 68 is again operated after a predetermined time for re-operation of the heater 68 elapses.

Also, when the water level of the tank 66 is lowered in accordance with the execution of the steam generating procedure (Steps S30 to S38), the water in the tank 66 may be insufficient. In this case, the water in the tank 66 is excessively heated, so that the internal temperature of the tank 66 increases excessively. Accordingly, when it is sensed by the temperature sensor 70 that the internal temperature of the tank 66 reaches the predetermined critical temperature, the water supplying procedure (Steps S20 to S26) is again carried out to replenish the tank 66 with wash water.

The above described steam supplying process is repeatedly executed during wash and rinse cycles.

Now, a washing method according to a second embodiment of the present invention will be described. The washing method according to the second embodiment of the present invention is similar to that of the first embodiment, so that it will be described in the following description, mainly in conjunction with processes and steps thereof different from those of the first embodiment.

The washing method according to the second embodiment of the present invention will be described in detail with reference to FIGS. 3 to 5 and FIG. 8.

After the determination of a required water level of the wash tub 52 based on the amount of clothes contained in the wash tub 52, following an initiation of operation of the washing machine, wash water is supplied into the wash tub 52 to a predetermined clothes wetting level. In this state, a clothes wetting step is executed. Thereafter, wash water is supplied into the wash tub 52 to the required water level. In this state, the wash tub 52 is rotated to perform a main washing operation.

Figure 8:
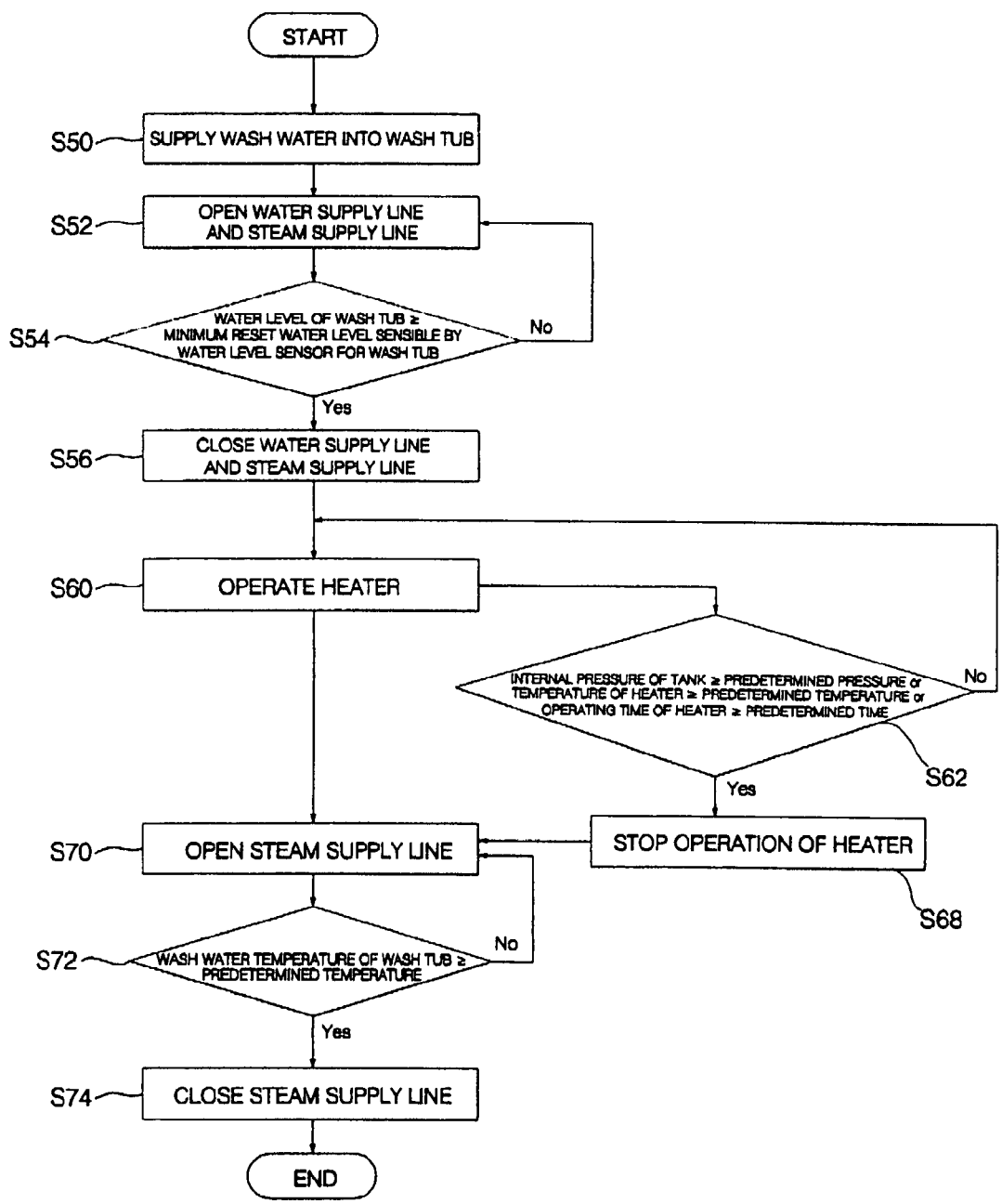
FIG. 8 is a flow chart illustrating a washing method according to a second embodiment of the present invention carried out in the steam injection type washing machine.

During the washing operation, a steam injecting process is executed to inject steam into the wash tub 52 at the top of the wash tub 52. In the steam supply process, as shown in FIG. 8, a water supplying procedure (Steps S50 to S56) is first carried out to supply wash water into the tank 66 to a predetermined level.

That is, both the steam supply line 62 and the steam supply line 64 are opened, simultaneously with the supply of wash water into the wash tub 52 (Step S50), so that the wash water is introduced into the tank 66 via the water supply line 62 (Step S52).

In this embodiment, a water level sensor is installed in the wash tub 52. When wash water is supplied into the wash tub 52 to a minimum reset water level sensible by the water level sensor (Step S54), it is determined that the tank 66 is in a state of being filled with a sufficient amount of wash water. In this state, accordingly, both the water supply line 62 and the steam supply line 64 are closed (Step S56).

The water level sensor for the wash tub 52 operates, in multiple stages to sense diverse reset water levels corresponding to diverse water levels of the wash tub to be sensed, respectively. When the water level sensor senses a reset water level in an initial stage thereof, that is, a minimum reset water level, it is determined that the supply of wash water into the tank 66 is to be completed.

Of course, the minimum reset water level sensible by the water level sensor for the wash tub 52 is lower than the predetermined clothes wetting water level. The tank 66 has a capacity determined to receive an amount of wash water supplied thereto until the water level of the wash tub 52 reaches the minimum reset water level.

Meanwhile, the supply of wash water into the wash tub 52 is carried out several times. When wash water is initially supplied into the wash tub 52, the water supplying procedure (Steps S50 to S56) is carried out to initially supply wash water into the tank 66. After completion of the initial supply of wash water into the tank 66, the water supplying procedure (Steps S50 to S56) may be again carried out. For example, when it is desired to replenish the tank 66 with wash water, the water supplying procedure is carried out. In this case, the wash tub 52 is also supplied with wash water. When a variation in the water level of the wash tub 52 caused by the re-supply of wash water into the wash tub 52 is sensed by the water level sensor for the wash tub 52, the re-supply of wash water into the tank 66 is completed.

After completion of the water supplying procedure (Steps S50 to S56), a steam generating procedure (Steps S60 and S62) is carried out. In the steam generating procedure, the heater 68 is operated to generate steam in the tank 66 (Step S60). In this case, the heater 68 is turned off and again turned on in accordance with the internal pressure of the tank 66, the temperature of the heater 68, or a predetermined operating time (Step S62).

When a sufficient amount of steam is generated in the tank 66, a steam injecting procedure (Steps S70 to S74) is carried out to open the steam supply line 64 (Step S70), and thus, to inject the steam into the wash tub 52 via the steam supply line 64.

The steam injecting procedure (Steps S70 to S74) is carried out until the temperature of wash water in the wash tub 52 reaches a sufficiently high temperature.

As apparent from the above description, in accordance with the washing method of the present invention, wash water is heated to generate high-temperature and high-pressure steam while passing through the steam supply unit in the wash or rinse cycle, and the generated steam is injected into the wash tub at the top of the wash tub. Accordingly, it is possible to rapidly achieve the wetting of clothes with wash water while achieving an enhancement in sterilization and washing performances. In addition, consumption of water and electrical energy can be reduced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A drum washing machine comprising:
   a water supply unit connected to an outside water source;
   a tub to hold water, the tub being in fluid communication with the water supply unit to receive the water;
   a drum rotatably mounted in the tub;
   at least one steam supply unit provided with an inlet which is connected only to a water supply line connected to the water supply unit to receive water from only the outside water source, a heater to heat the water to produce steam, and an outlet to discharge steam into the tub, the at least one steam supply unit configured to supply the steam at an upper portion of the tub during an operation for treating laundry inside the drum; and
   at least one circulation pump to circulate the water inside the tub, the at least one circulation pump is connected to a first water line to draw out the water inside the tub therethrough and a second water line to supply the drawn water into the tub therethrough.

2. The washing machine of claim 1, wherein each of the steam supply unit and the circulation pump is connected with at least one fluid supply line in communication with an inner space of the tub.

3. The washing machine of claim 2, wherein a nozzle is provided in at least one end of the fluid supply line.

4. The washing machine of claim 1, wherein the outlet of the steam supply unit is disposed in communication with an inner space of the tub.

5. The washing machine of claim 1, wherein the steam supply unit further comprises a pressure tank for holding water.

6. The washing machine of claim 5, wherein the heater is provided within the pressure tank.

7. The washing machine of claim 1, wherein the supply of steam and the circulation of the water is performed simultaneously.

8. A drum washing machine comprising:
   a water supply unit connected to an outside water source;
   a tub to hold water therein, the tub being in fluid communication with the water supply unit to receive the water;
   a drum rotatably provided within the tub;
   a steam supply unit to generate steam;
   a water supply line connected between the water supply unit and the steam supply unit to allow water to flow only from the outside water source to an inlet of the steam supply unit;
   a steam supply line connected to the steam supply unit to guide the steam into the tub or the drum;
   a circulating pump to pump the water of the tub into the drum;
   a first water line connected between the circulation pump and the tub to draw out the water inside the tub therethrough;
   a second water line connected to the circulation pump to guide the water pumped by the circulating pump into the drum; and
   an injection nozzle provided on at least one end of the steam supply line and the second water line, the injection nozzle located at an upper portion of the tub so as to supply the steam into the tub during an operation for treating laundry inside the drum.

9. The washing machine of claim 8, wherein the steam supply unit further comprises a pressure tank for holding water.

10. The washing machine of claim 9, wherein a heater is provided within the pressure tank.

11. The washing machine of claim 8, wherein the supply of steam and the circulation of the water is performed simultaneously.

12. The washing machine of claim 8, wherein the supply of steam and the circulation of the water is performed sequentially.

13. The washing machine of claim 1, wherein the supply of steam and the circulation of the water is performed sequentially.

* * * * *